United States Patent [19]
Bhat et al.

[11] Patent Number: 5,640,491
[45] Date of Patent: Jun. 17, 1997

[54] CONTROL SYSTEM USING AN ADAPTIVE NEURAL NETWORK FOR TARGET AND PATH OPTIMIZATION FOR A MULTIVARIABLE, NONLINEAR PROCESS

[75] Inventors: Naveen V. Bhat; William B. Braden; Kent E. Heckendoorn, all of Houston, Tex.; Timothy J. Graettinger, Bethel Park; Alexander J. Federowicz, Pittsburgh, both of Pa.; Paul A. Dubose, Chapel Hill, N.C.

[73] Assignees: Texaco, Inc.; Neuralware, Inc.

[21] Appl. No.: 574,250

[22] Filed: Dec. 18, 1995

Related U.S. Application Data

[62] Division of Ser. No. 944,645, Apr. 14, 1992, Pat. No. 5,477,444.

[51] Int. Cl.$^6$ ................................. G05B 13/02
[52] U.S. Cl. ...................... 395/22; 395/23; 395/24; 395/903; 395/906
[58] Field of Search .................. 395/22, 23, 903, 395/24, 906

[56] References Cited

U.S. PATENT DOCUMENTS

| | | | |
|---|---|---|---|
| 4,230,534 | 10/1980 | Stewart | 364/501 |
| 4,858,147 | 8/1989 | Conwell | 364/148 |
| 5,111,531 | 5/1992 | Grayson, et al. | 364/162 |
| 5,241,509 | 8/1993 | Jousselin et al. | 395/27 |
| 5,268,834 | 12/1993 | Sanner et al. | 364/151 |
| 5,268,835 | 12/1993 | Miyagaki et al. | 364/151 |
| 5,282,261 | 1/1994 | Skeirik | 394/24 |
| 5,285,377 | 2/1994 | Sugasaka et al. | 364/148 |
| 5,305,230 | 4/1994 | Matsumoto et al. | 364/149 |
| 5,311,421 | 5/1994 | Nomura et al. | 364/157 |

FOREIGN PATENT DOCUMENTS

| | | |
|---|---|---|
| 0432267A1 | 3/1990 | European Pat. Off. . |
| WO93/25943 | 12/1993 | WIPO . |

OTHER PUBLICATIONS

Bhat et al, "Modeling Chemical Process Systems Via Neural Computation" IEEE Control System Magazine, Apr. 1990.

Venkatasubramanian et al, "Process Fault Detection and Diagnosis Using Neural Networks" Computers Chem. Engng. vol. 14, No. 7, 1990.

(List continued on next page.)

*Primary Examiner*—George B. Davis
*Attorney, Agent, or Firm*—Pravel, Hewitt, Kimball & Krieger

[57] ABSTRACT

A control system having four major components: a target optimizer, a path optimizer, a neural network adaptation controller and a neural network. In the target optimizer, the controlled variables are optimized to provide the most economically desirable outputs, subject to operating constraints. Various manipulated variable and disturbance values are provided for modeling purposes. The neural network receives as inputs a plurality of settings for each manipulated and disturbance variable. For target optimization all the neural network input values are set equal to produce a steady state controlled variable value. The entire process is repeated with differing manipulated variable values until an optimal solution develops. The resulting target controlled and manipulated variable values are provided to the path optimizer to allow the manipulated variables to be adjusted to obtain the target output. Various manipulated variable values are developed to model moves from current to desired values. In this case trend indicating values of the manipulated and disturbance variables are provided to produce time varying values of the controlled variables. The process is repeated until an optimal path is obtained, at which time the manipulated variable values are applied to the actual process. On a periodic basis all of the disturbance, manipulated and controlled variables are sampled to find areas where the training of the neural network is sparse or where high dynamic conditions are indicated. These values are added to the set of values used to train the neural network.

4 Claims, 14 Drawing Sheets

OTHER PUBLICATIONS

Lee, et. al., "A New Scheme Combining Neural Feedforward Control With Model Predictive Control," *AIChE Journal*, pp. 193–199, Feb. 1992, vol. 38, No. 2.

Zupan, et al., "Neural networks: A new method for solving chemical problems or just a passing phase?" *Analytica Chimica Acta*, 248 (1991) 1–30, Elsevier Science Publishers B.V., Amsterdam.

Saint–Donat, et al., "Neural net based model predictive control," *Int. J. Control*, 1991, vol. 54, No. 6, pp. 1453–1468.

Bhat, "System Identification and Control of Dynamic Chemical Processes Using Backprupagation Networks," UMI Dissertation Services, 1991.

CONTROL SYSTEM USING AN ADAPTIVE NEURAL NETWORK FOR TARGET AND PATH OPTIMIZATION FOR A MULTIVARIABLE, NONLINEAR PROCESS

This is a division of application Ser. No. 07/944,645, filed Sep. 14, 1992, U.S. Pat. No. 5,477,444.

BACKGROUND OF THE INVENTION

1. Field of the Invention

The invention relates to control systems used in process control environments, particularly to control systems developing optimal target outputs and taking optimal paths from current to desired target conditions for non-linear processes, and more particularly to control systems utilizing neural networks in the optimization processes.

2. Description of the Related Art

In many industrial environments there are numerous processes which must be controlled. Examples include oil refineries, chemical plants, power plants, and so on. For example, in oil refineries base crude oil feed stocks enter the refineries and after numerous individual distillation or reaction processes, a panoply of hydrocarbon streams are output. Each one of the individual processes must be basically controlled or disaster could result. Above this basic standard, each individual process must be properly controlled to develop acceptable outputs.

Each of the processes has numerous inputs or disturbance variables, such as input compositions, feed rates and feed stock temperatures. Numerous outputs or controlled variables also usually are present, such as the properties of various output streams. To perform process control, certain settable items or manipulated variables are also present, such as heating, cooling and recirculation rates.

Conventionally, control of the process was performed using feedback techniques. The controlled variables or outputs were measured and compared against desired values. If errors were present, changes were made to the manipulated variables based on the errors. One problem generally resulting from feedback control was stability concerns in the process, as the time delay may be critical in physical systems. Alternatively, the output may have reflected an undesirable trend or condition too late for adequate control of the process. Historically, proportional-integral-derivative (PID) controllers were utilized for feedback control. One problem generally resulting from the use of PID controllers was lack of multivariable control, as a PID controller only has one input variable and one output variable. Further, no economic control can be readily performed. Most real world systems have numerous controlled, disturbance and manipulated variables. Very complex arrangements of PID controllers could be utilized, but the sheer complexity often limited confidence and testability, much less a determination of optimal control.

Certain feedforward techniques were utilized with some success. These techniques utilized a linear model of the process being controlled and various changes to the manipulated variables were simulated. Preferably the simulation allowed a quicker response time than feedback control and the model preferably utilized all the major disturbance, manipulated and controlled variables of the process, allowing multiple variable control. By using the disturbance or input variables, the controlled variables could be obtained, those generally being present downstream of where the disturbance variables were measured, thus leading to the feedforward definition. However, the existing feedforward, modeling techniques have a major limitation. They operate primarily on linear or linearized systems, where a linear model can be developed. The problem is that most of the more complex processes are by nature non-linear. Further, the models are not updated when minor process changes occur. Thus accuracy and/or range are sacrificed when linear modeling is utilized.

Therefore a control system which can perform fast feedforward control for non-linear systems with high accuracy over a wide range is desirable.

SUMMARY OF THE PRESENT INVENTION

The present invention is a control system which provides accurate feedforward control for non-linear systems. Optimization techniques are utilized both to determine the optimal target manipulated and controlled variable values based on the disturbance variable values, various variable limits and economic concerns and to determine the optimal path from existing manipulated variable settings to the necessary settings to obtain the target controlled variable values. A neural network is used to model the process being controlled, allowing non-linear operation. Further, the neural network is designed to provide either steady state outputs, for use in the target optimization, or next time step outputs, for use in the path optimization.

A control system according to the present invention has four major components: a target optimizer, a path optimizer, a neural network adaptation controller and a neural network utilized by all three. The two optimizers utilize sequential quadratic programing (SQP) to determine the various values provided to the neural network for modeling purposes, preferably a variation which uses only feasible values in the various iterations to a solution, referred to as FSQP.

In the target optimizer, the controlled variables are optimized to provide the most economically desirable outputs, subject to the various system constraints. The sum of the output stream values less the sum of the operating costs is maximized. In other instances other properties could be maximized, depending on the particular system. The FSQP portion provides possible manipulated variable values. These values are utilized along with the disturbance variable values in the neural network to produce an output. The neural network is designed to receive as inputs a plurality of settings for each manipulated variable and each disturbance variable. In this case all the values for each manipulated and disturbance variable are set equal to produce a steady state controlled variable value. The output values of the controlled variables and the related costs associated with the manipulated variables are processed to develop an economic value. The entire process is then repeated with new manipulated variable values provided by the FSQP portion. This iterative process continues until an optimal solution develops. If none develops, certain restraints as to the feasible limits are removed or changed and the process repeated, until the most optimal solution is developed.

The target controlled variable values and associated manipulated variable values which provide the optimized result are provided to the path optimizer to allow the manipulated variables to be adjusted from their present values to the values needed to obtain the optimized output. Again an optimal output is desired. In this case the sum of the squared errors between the actual controlled variable value and the desired value for a series of time steps and a manipulated variable move aggressiveness factor is minimized as the objective function. The FSQP portion receives the various manipulated variable limits and develops various manipulated variable values to move from current to desired values. These values are combined with the disturbance values in the neural network. In this case time varying values of the manipulated and disturbance values are provided to the plurality of manipulated and disturbance variable inputs of the neural network. This results in the output of the neural network being the value of the controlled variables at the next time step. The process is repeated for each set of manipulated variable values developed by the FSQP portion so that hopefully the target values are obtained. When reached, the objective function value is stored, along with the manipulated and controlled variable values for that particular path, to allow determination of the gradient of the objective function based on the manipulated variable changes. Then the entire process is again repeated for another path between the current and desired values. After the optimal path is obtained, the first manipulated variable values of the optimal sequence are applied to the actual process.

Preferably the path optimization process is repeated on a periodic basis, but the target optimization process occurs only when certain trigger limits for the various values are exceeded. Thus target optimization is performed less frequently, reducing the changes to the path optimizer, resulting in a more stable output and requiring significantly less computational time.

In addition, a system according to the present invention also adapts to changing conditions to fine tune its operation. On a periodic basis all of the disturbance, manipulated and controlled variables are sampled. If the sampled data indicates areas where the training of the neural network is sparse or high dynamic conditions are indicated, the values are added to the set of values used to train the neural network. Eventually over time, a very complete training set is gathered to allow best development of the neural network coefficients. Preferably retraining of the neural network is accomplished on operator command, but the retraining could be initiated automatically upon receipt of a certain number of new samples. Certain checks are performed on the new coefficients and then, after approval, the new neural network coefficients are utilized and the process more accurately controlled based on the increased training data.

The preferred embodiment utilizes a control system as summarized above to control a debutanizer in an oil refinery. Details are provided below.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
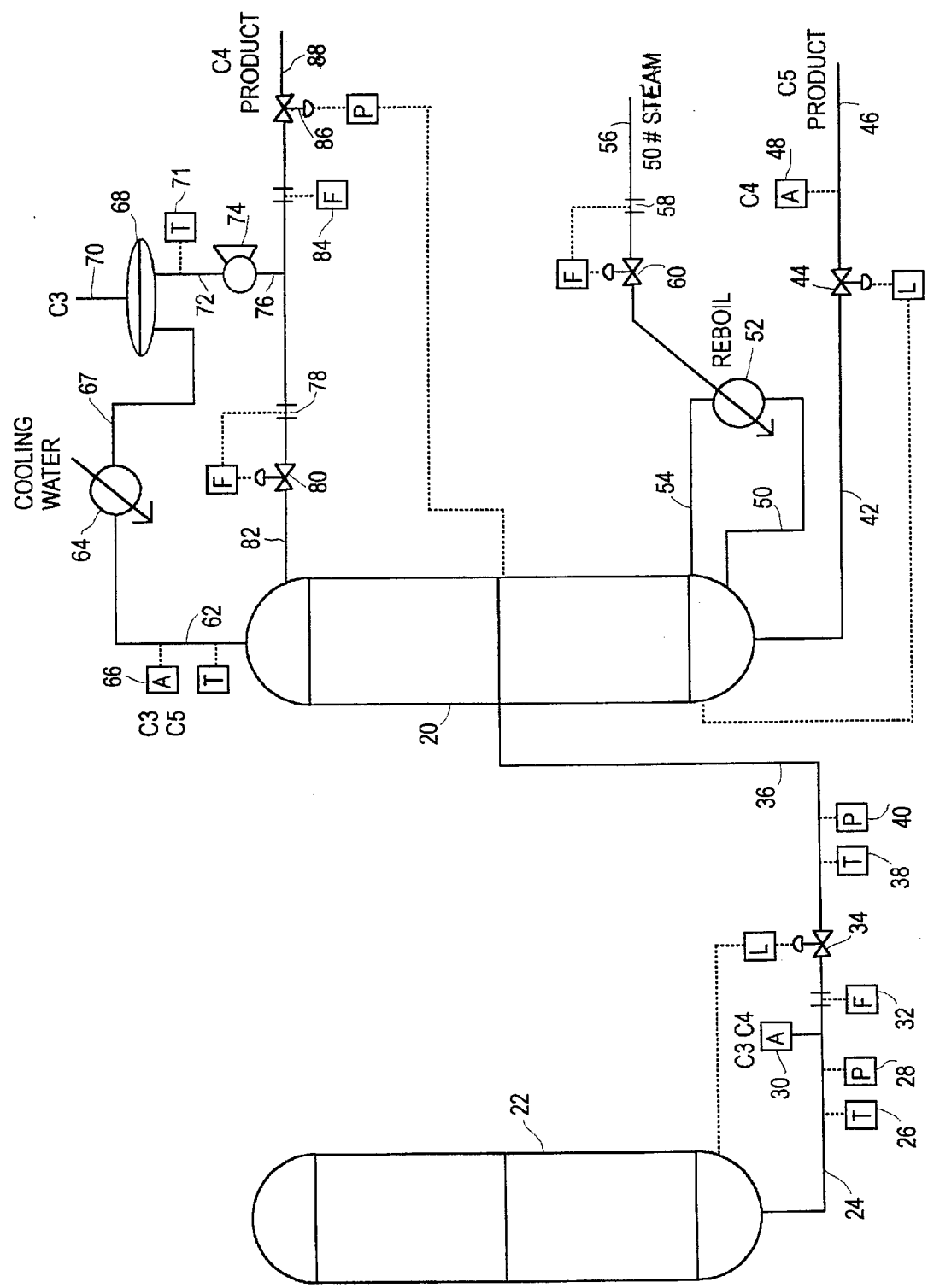
FIG. 1 is a piping drawing of a depropanizer-debutanizer system controlled by a control system according to the present invention.

Referring now to FIG. 1, the piping drawing of the physical system of the preferred embodiment is shown. The preferred embodiment is the process control of a conventional debutanizer 20 in an oil refinery. A depropanizer 22 has a bottoms outlet pipe 24. A temperature sensor 26, preferably a thermocouple, and a pressure transducer 28 measure the temperature and pressure of the stream in the pipe 24. Additionally, an analyzer 30 measures the C3 and C4 hydrocarbon components in the stream in the pipe. C3 components are considered as those hydrocarbon compositions in the stream having 3 carbon atoms, such as propane propalyne. C4 components are those compositions in the stream having 4 carbon atoms, such as butane, butalyne and butadiene. Similarly C5 components are those compositions in the stream having 5 carbon atoms, such as pentane, pentalyne and pentadiene. Conventionally the analyzer 30 is a gas chromatograph, but in the preferred embodiment it is preferably an analyzer based on an inference technique as described in application Ser. No. 07/935,028, entitled "Method for Inferring Concentrations of Process System Components for use in Control Systems", filed Aug. 25, 1992. In the inferencing technique the material, which is near its bubble point in the depropanizer 22, has its temperature and pressure measured at one point and is transmitted across an expansion valve to allow the stream to partially flash and then has its temperature and pressure remeasured. Because part of the stream will have vaporized, so that the pressure and temperature will have changed, this measuring of two temperature and pressure sets provides sufficient data points so that a linear regression technique can be used to determine two of the three component percentages, with the third being developed by simple subtraction. This inferencing is preferred because it is significantly faster then a gas chromatograph.

Further downstream on the pipe 24 is a flow meter 32. The pipe 24 then proceeds to a valve 34, the valve opening being controlled by a level controller based on the level of the fluids in the depropanizer 22. A feed pipe 36 is provided from the valve 34 to the debutanizer 20, preferably entering the debutanizer 20 half way up the debutanizer 20. A temperature sensor 38, again preferably a thermocouple, and a pressure sensor 40 determine the temperature and pressure of the feed stream to the debutanizer 20. Preferably the debutanizer 20 has a series of trays as commonly utilized in such devices. The debutanizer system basically produces two output streams, one of which is the C4 product and one of which is the C5 product.

The C5 product is obtained from the bottom of the debutanizer 20. A bottoms pipe 42 is connected from the bottom of the debutanizer 20 to a bottom valve 44. The opening of the bottom valve 44 is controlled by the level of fluid in the debutanizer 20 by a level controller so that the fluid level does not get too low or too high. A pipe 46 is connected from the valve 44 to the next location in the refinery process which will utilize and operate on the C5 product. The stream provided in this pipe 46 is considered to be an output of the process. An analyzer 48 is connected to the pipe 46 to determine the concentration of C4 material in the C5 product stream.

Additionally, certain material from the bottom of the debutanizer 20 is reheated or reboiled and fed back into the bottom of the debutanizer 20. A reboil exit pipe 50 exits near the bottom of the debutanizer 20 and proceeds through a heat exchanger 52 to a reboil return pipe 54, which returns to the debutanizer 20 at a level above the reboil exit pipe 50. A line 56 containing 50 pound steam is provided through a flow sensor 58 to a valve 60. The opening of the valve 60 is controlled by a flow controller to a desired set point based on the flow rate as measured by the flow meter 58. The output of the valve 60 is provided through the heat exchanger 58 to provide the heat used to reboil the material obtained from the debutanizer 20.

The C4 and C3 products in the feed stream are lighter than the C5 product end are removed from the top of the debutanizer 20. A top pipe 62 exits the top of the debutanizer 20 and is connected to a heat exchanger 64. Preferably an analyzer 66 which measures the C3 and C5 product concentrations is connected to the pipe 62. Cooling water is transmitted through the heat exchanger 64 to condense and reduce the temperature of the materials exiting the top of the debutanizer 20. A pipe 67 is connected from the heat exchanger 64 to deliver the cooled stream to a surge tank 68. A vent pipe 70 is provided from the top of surge tank 68 to transmit the C3 components which are still vaporized after the sub-cooling in the heat exchanger 64. A pipe 72 is connected from the bottom of the surge tank 68 to a pump 74, whose output is connected to a pipe 76. A temperature sensor 71 measures the temperature of the stream in pipe 72.

The pipe 76 tees, with one direction proceeding through a flow meter 78 to a reflux valve 80. The reflux valve 80 is controlled by a flow controller to a desired set point based on the flow rate provided by the flow meter 78. A pipe 82 is connected to the valve 80 and to near the top of the debutanizer 20 to allow refluxing of the stream as desired. The second portion of the tee of pipe 76 goes through a flow meter 84 to an exit valve 86. The exit valve 86 is a pressure controlled valve based on a pressure reading taken at approximately the middle of the debutanizer 20. The output of the valve 86 is connected to a pipe 88, which then goes to the next item in the chain which receives the output C4 product material. This is a simplified explanation of the piping of a debutanizer.

The various disturbance variables in the debutanizer control stream include the feed stream flow rate as measured by the flow meter 32, the feed stream temperature as measured by the temperature sensor 38, the C3 and C4 component feed concentrations as determined by the analyzer 30 and the temperature of the reflux stream as measured by the temperature sensor 71 connected to the pipe 72. The controlled variables of the process are the concentration of C5 materials exiting the top of the debutanizer 20 as measured by the analyzer 66 and the C4 concentration in the C5 product stream provided in the pipe 46 as determined by the analyzer 48. The manipulated variables are the reflux flow rate as determined by the flow meter 78 and set by the valve 80, the reboil steam flow rate as measured by the flow meter 58 and set by the valve 60 and the pressure in the debutanizer tower 20 as controlled by the valve 86. It is noted that each of these valves 60, 80 and 86 has an associated controller, with the controller set points being adjustable to perform the control operations of the process.

Figure 2:
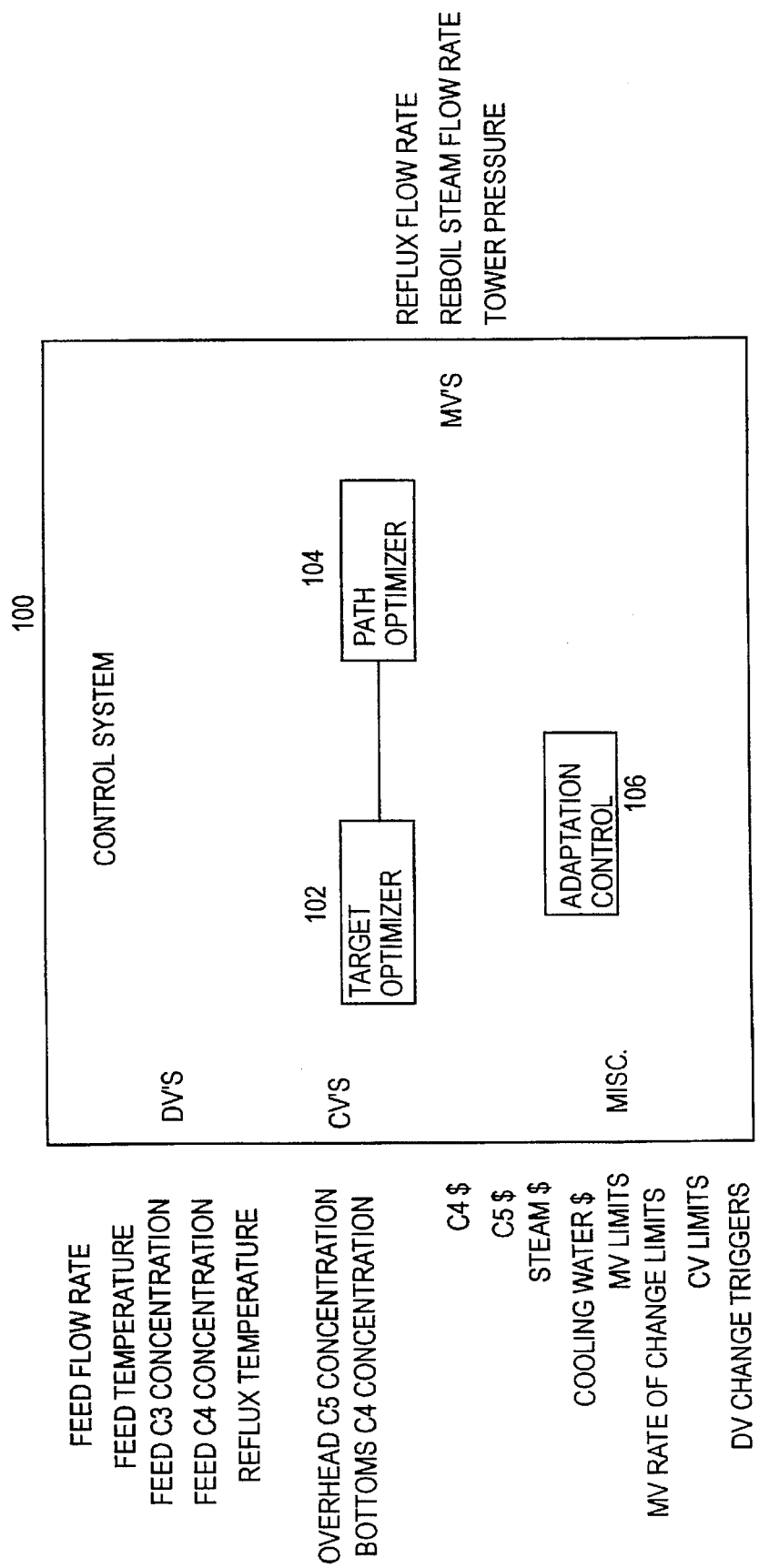
FIG. 2 is a block diagram showing the various inputs and outputs of a control system according to the present invention for use on the debutanizer of FIG. 1.

Turning now to FIG. 2, a basic block diagram of the control system for use with the debutanizer 20 of FIG. 1 is shown. Control system 100 has three major portions, a target optimizer 102, a path optimizer 104 and adaptation control 106. Inputs to the control system 100 are the disturbance variables, the controlled variables and a series of other parameters utilized in the optimization processes. Some of these miscellaneous inputs include the values of certain quantities of the C4 and C5 products, preferably done as a cost curve or table; the cost of the 50 pound steam utilized in the reboiling operation; and the cost of the cooling water utilized in the heat exchanger 64. To control the optimization operations it is also understood that the various manipulated variables have certain physical limits, so reflux flow rate limits, reboil steam rate limits and tower pressure limits are provided as inputs to the control system 100. Further, for reasons explained below relating to the maximum step size to allow a smooth transition taken in a change, rate of change limits for the manipulated variables are inputs. Additionally, there are also certain target limits for the output stream impurities, that is the C4 concentration in the bottom or C5 product output and the C5 concentration in the overhead or C4 product output, for the outputs to be considered optimal. Additionally, other inputs include disturbance variable trigger values as will be explained below relating to the various rates of change in the disturbance variables necessary to initiate the target optimization process.

The primary outputs of the control system 100 are the three manipulated variable values, that is the reflux flow rate set point, the reboil steam flow rate set point and the tower pressure set point as utilized with the valves 60, 80 and 86. Additionally, the predicted manipulated variable values and trending of the controlled variables are providing to the system to allow an operator to view the predicted future operation of the process.

Figure 3:
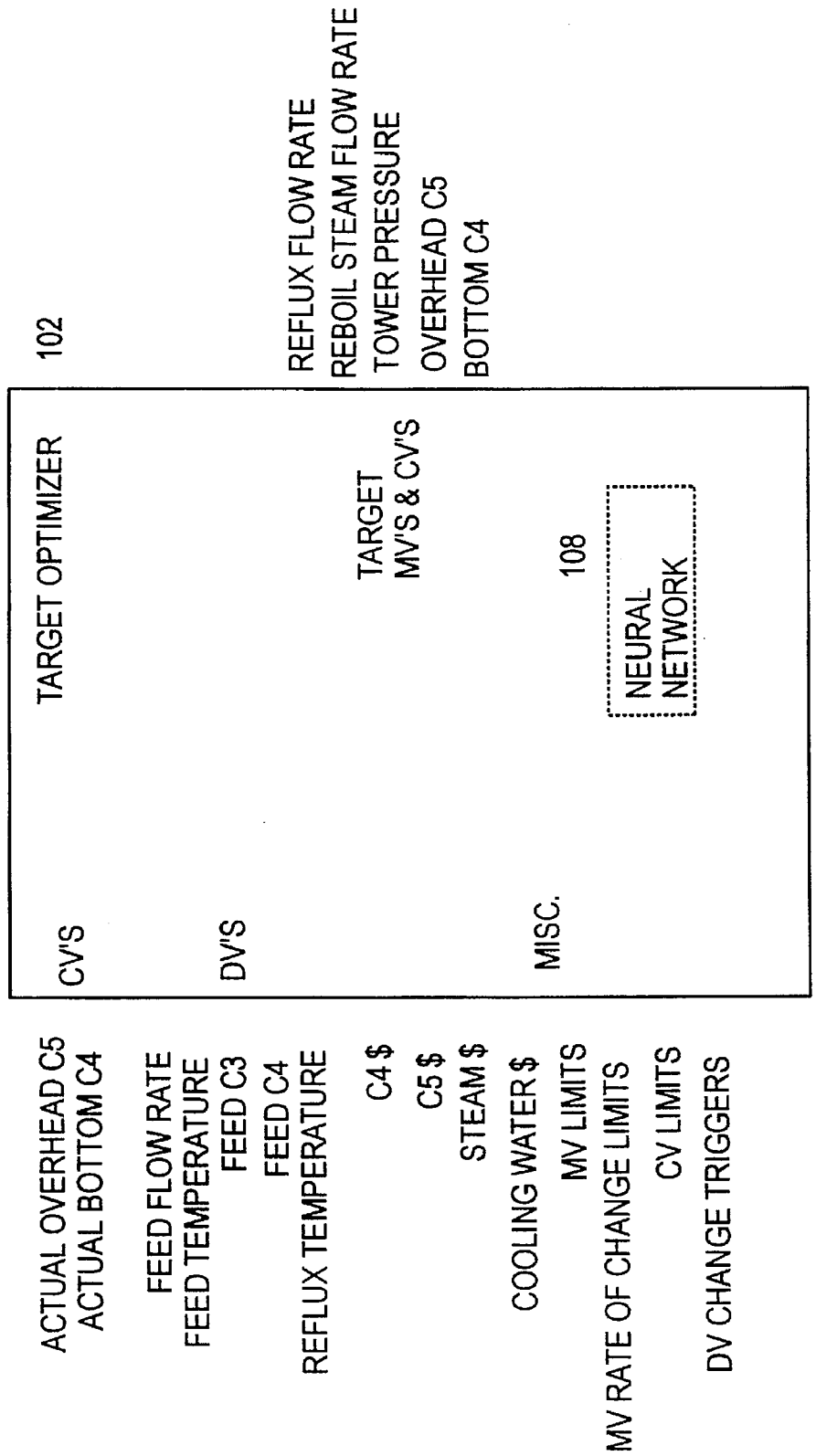
FIG. 3 is a block diagram illustrating the inputs and outputs of the target optimizer in the control system of FIG. 2.

Addressing the target optimizer 102, FIG. 3 shows a block diagram illustrating the target optimizer 102 with its various inputs and outputs. In addition, a neural network 108 is shown as being incorporated in the target optimizer 102. The target optimizer 102 receives the actual controlled variable values as measured by the analyzers 48 and 66 and the disturbance variable values. Additionally, certain miscellaneous inputs including the various cost numbers as provided to the control system 100 are provided to the target optimizer 102, as well as the bottom C4 and overhead C5 concentration limits and the reflux flow rate, reboil flow rate and tower pressure limits. Additionally, rate of change limits for the manipulated variables are also provided. This is done as the path optimizer 104 can move only a finite number of steps in its prediction, so it is desirable to limit the change in the manipulated variables as requested by the target optimizer 102 to a value equal to the rate of charge times the number of steps. The outputs of the target optimizer 102 are the target or desired manipulated variable values and the target or desired controlled variable values to produce the optimal operation of the debutanizer 20. The development of these values will be explained in detail below.

Figure 4:
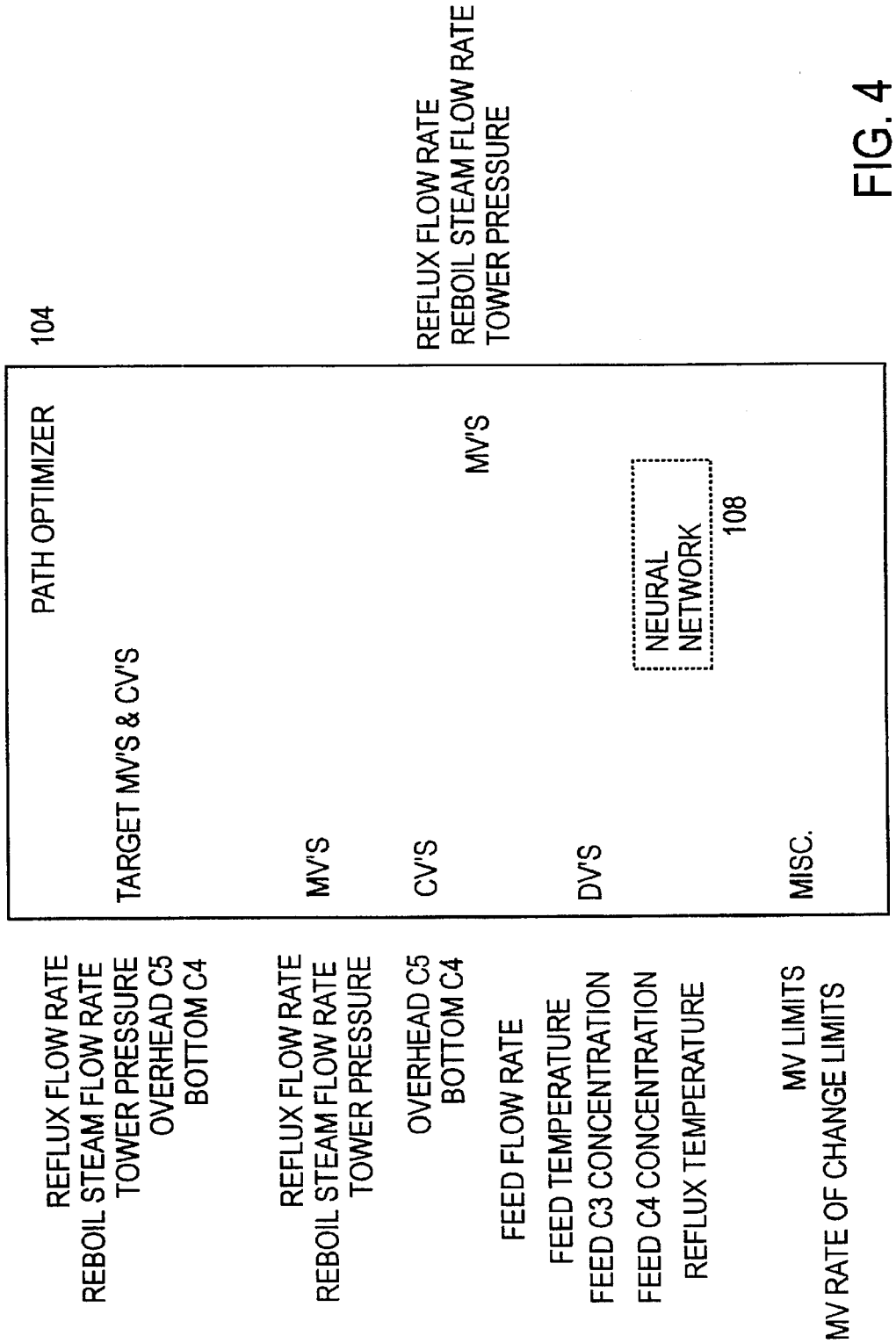
FIG. 4 is a block diagram illustrating the inputs and outputs of the path optimizer in the control system of FIG. 2.

FIG. 4 illustrates a block diagram of the path optimizer 104 with its various inputs and outputs. The path optimizer 104 receives as inputs the target manipulated variable and controlled variable values from the target optimizer 102, the actual values of the disturbance variables and the actual values of the controlled variables. Also, the reflux flow rate, reboil stream flow rate and tower pressure limits are provided as miscellaneous inputs. The path optimizer 104 also utilizes or contains the neural network 108. The outputs of the path optimizer 104 are the actual manipulated variable values for the next time step to be applied to the system of FIG. 1 and the future values for use in the graphical trend display provided on the operator workstation.

Figure 5:
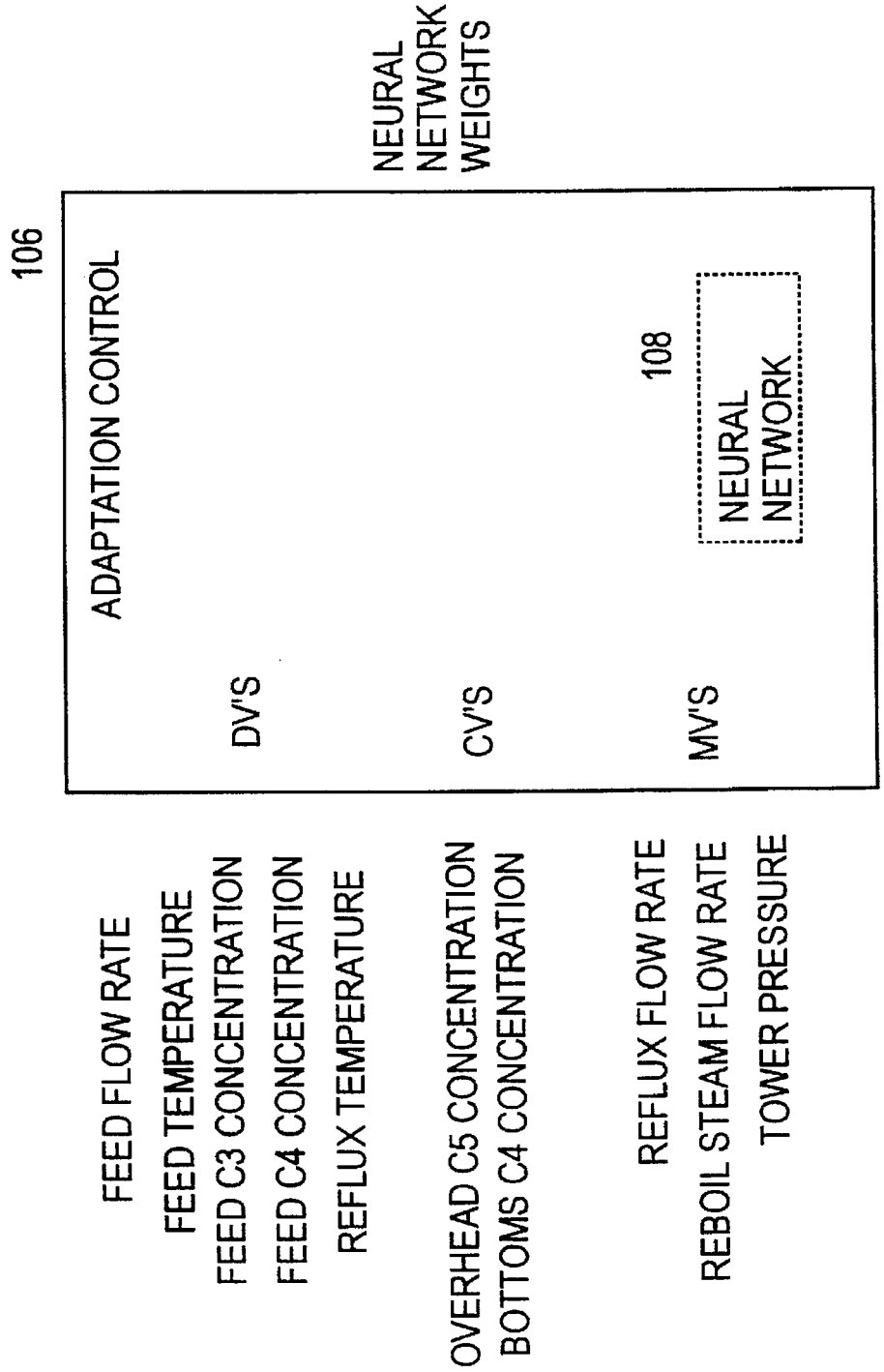
FIG. 5 is a block diagram illustrating the inputs and outputs of the adaptation control in the control system of FIG. 2.

The adaptation control 106 (FIG. 5) is utilized to determine the initial coefficients or values used in the neural network 108 and to further train the neural network 108 as operations proceed. The adaptation control 106 receives the values of the disturbance variables, the manipulated variables and the control variables on a periodic basis and provides as outputs new weighting coefficients or the weight matrix for use by the neural network 108.

Figure 6:
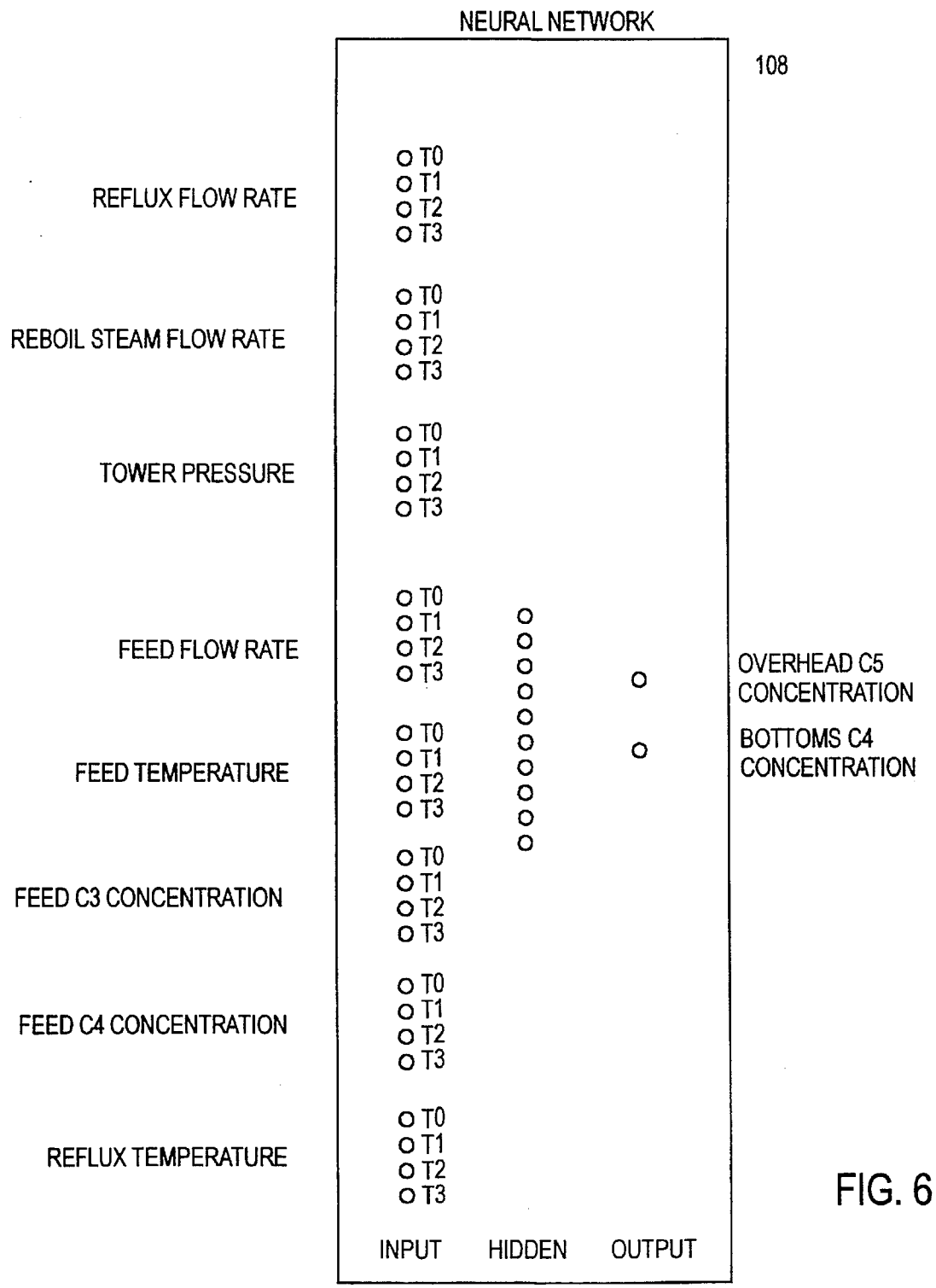
FIG. 6 is a diagram of the neural network used in the target optimizer, path optimizer and adaptation control of FIGS. 3, 4 and 5.

The neural network 108 is shown in detail in FIG. 6. It is preferably a conventional three layer network with an input layer, a hidden layer and an output layer. The neural network 108 is preferably developed using matrix mathematical techniques commonly used in programmed neural networks. Input vectors are multiplied by a weight matrix for each layer, the values in weight matrix representing the weightings or coefficients of the particular input to the result being provided by the related neuron. An output vector results. The input layer uses the inputs to the neural network 108 as the input vector, and produces an output vector used as the input vector for the hidden layer. The hidden layer matrix multiplication in turn produces an output vector used as the input vector for the output layer multiplication. The output vector of the output layer is the final output of the neural network, in this case the C4 and C5 impurity concentration values or controlled variables. Preferably the neurons in the neural network 108 use a hyperbolic transfer function such as $$\frac{e^x - e^{-x}}{e^x + e^{-x}}$$

for X values of −1 to 1, The neural network 108, based on its training, readily handles nonlinear situations, so that a model of a nonlinear process is readily developed by the use of the neural network 108.

When used with the debutanizer 20, the neural network 108 has 32 input neurons, 10 hidden neurons and 2 output neurons. The inputs to the neural network 108 are the 4 sets of the manipulated variables and 4 sets of the disturbance variables. Four sets of the manipulated variables are utilized so that either steady state output values can be developed for use with the target optimizer 102 or time sampled output values, i.e. the next step, can be developed for the path optimizer 104. Sets of the disturbance variables are used because in the preferred embodiment the process is also dependent on changes in the disturbance variables, as well as the manipulated variables. So sets are used to better model the trend or time dependent nature of the disturbance variables. The neural network 108 is considered as being fully connected in that each of the neurons of the hidden layer receives the outputs of all the input layer neurons and each of the neurons of the output layer receives the outputs of all of the hidden layers. The outputs of the neural network 108 are the controlled variable values, the overhead C5 concentration and the bottom C4 concentration, which are preferably less than 2 mole %.

Figure 7:
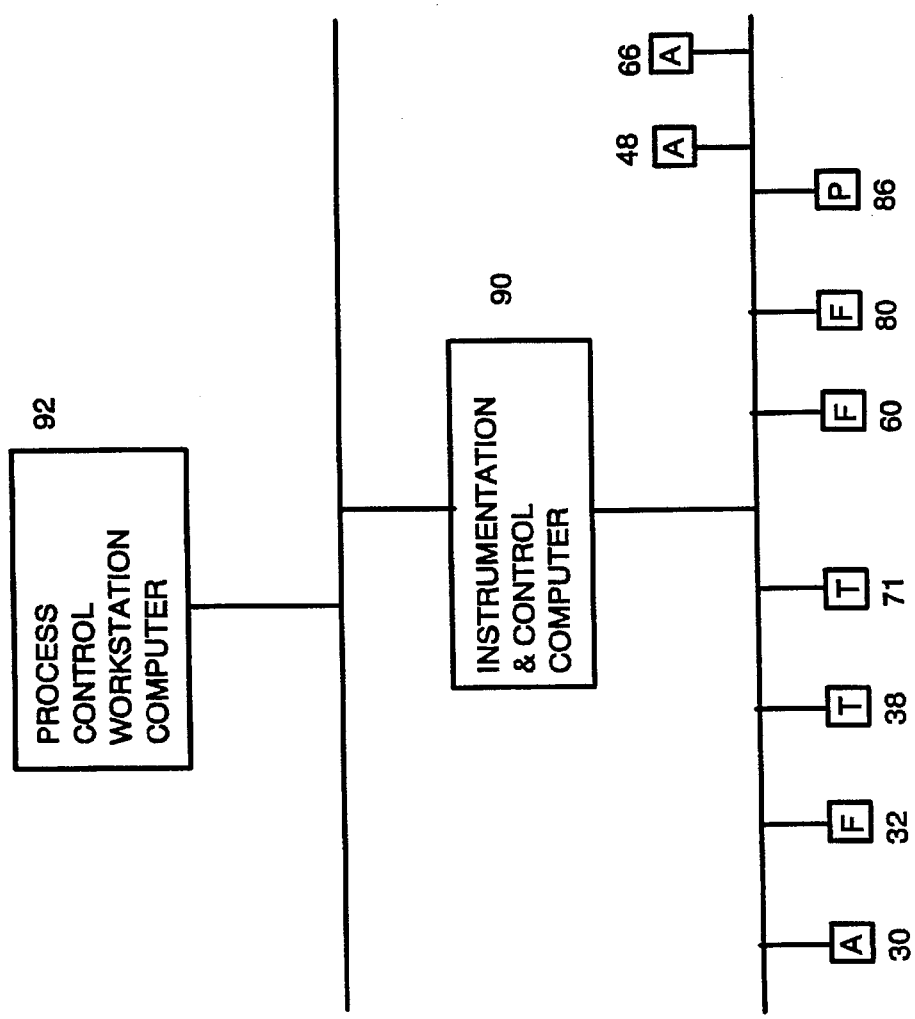
FIG. 7 is a block diagram of the electrical circuitry according to the present invention for use on the debutanizer of FIG. 1.

Preferably the control system 100 is developed using general purpose computer systems, such as various workstation computers or others, and the appropriate sensors and output drivers as shown in FIG. 7. The various measured values are provided from the various analyzers 30, 48 and 66 and sensors 32, 38 and 71 over a communications network from the measurement site to a data gathering or instrumentation and control computer 90 as appropriate for the specific plant environment. The input data is then transferred from the instrumentation computer 90 to the actual workstation computer 92 executing the steps of the control process. Similarly, the output values are provided by the workstation 92 executing the control process steps to the instrumentation computer 90 and then out over the communications network to the particular valve controllers 60, 80 and 86. The various variable limits, cost information and trigger values are generally provided by the system operator directly to the workstation 92. Additionally, the neural network 108 is also preferably developed using the appropriate program on the workstation 92.

Figure 8:
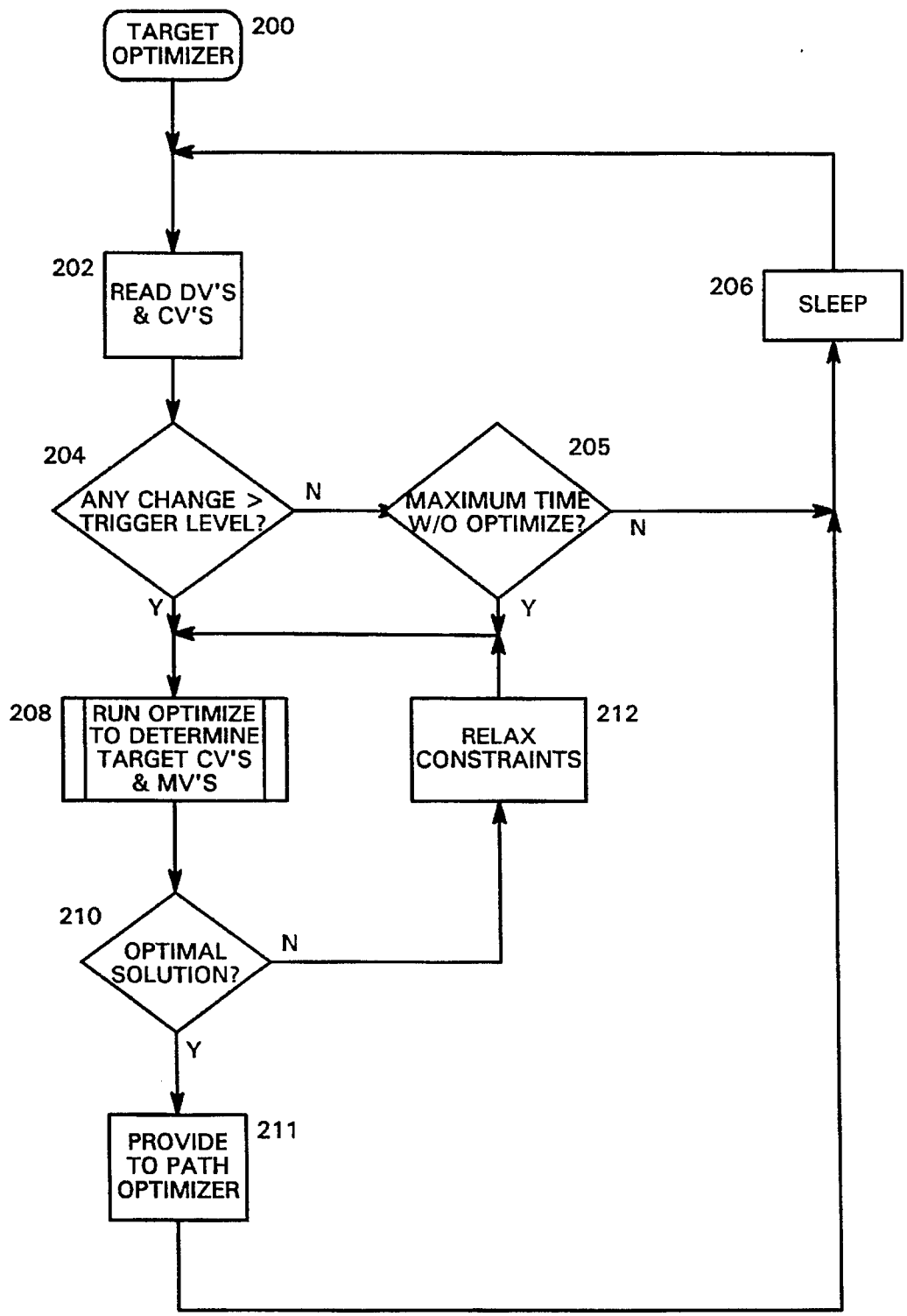
FIG. 8 is a flowchart of the operation of the target optimizer of FIG. 3.
Figure 14:
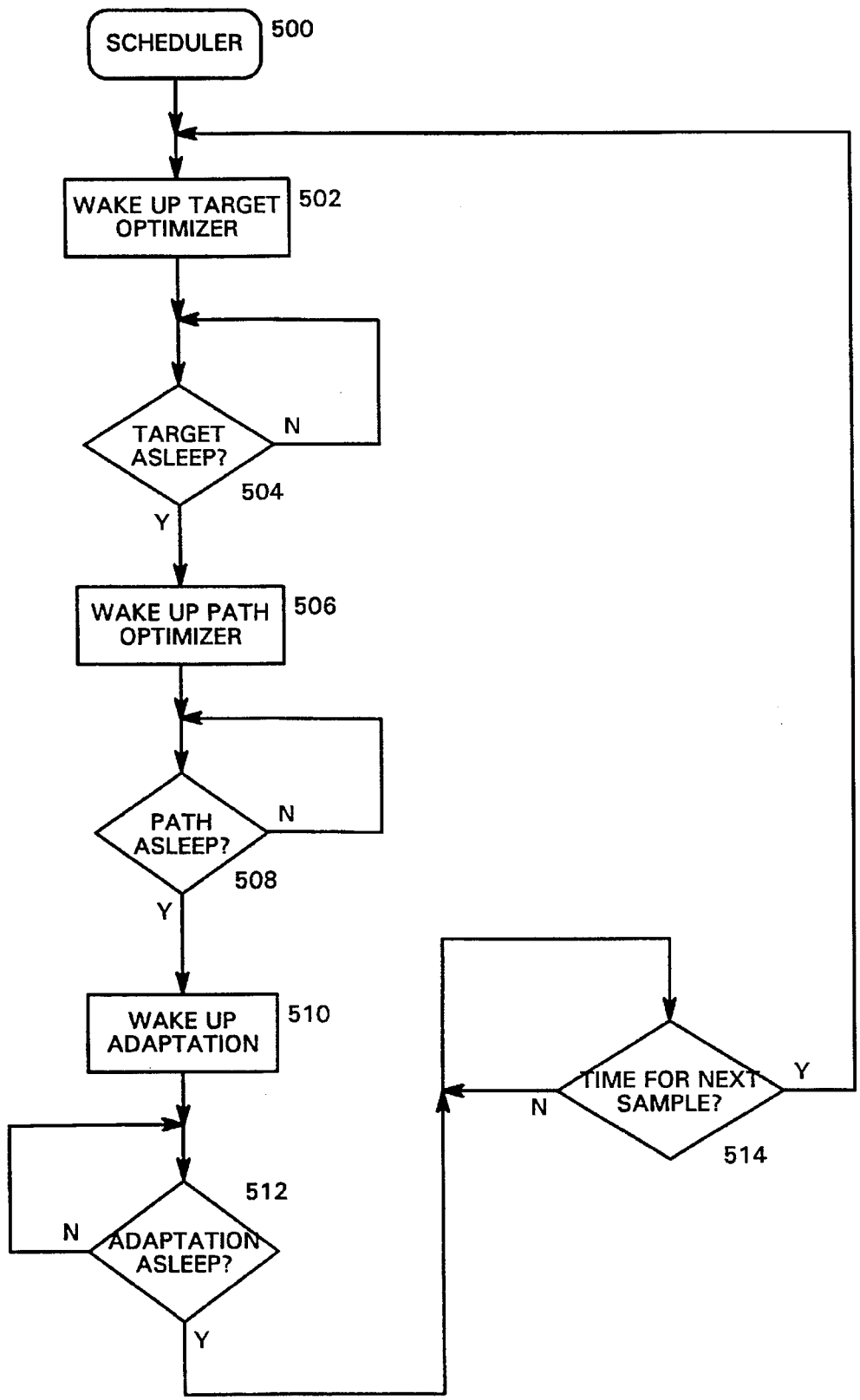
FIG. 14 is a flowchart of operation of a scheduler for starting the target and path optimizers and adaptation control of FIGS. 8, 10 and 12.

As digital computers are preferably utilized in executing the process, certain flowcharts are thus appropriate to indicate the operation of the actual process of the control system 100. Referring now to FIG. 8, the target optimizer sequence 200 commences at step 202 where the computer reads various disturbance and controlled variable values. After reading is completed, control proceeds to step 204 to determine if any of the disturbance variable or controlled variables values changed by an amount greater than the appropriate trigger value, which values have been previously set by the system operator using certain utility functions. In conventional systems the target optimizer sequence 200 operates on a periodic basis, even if there has been little or no change in the actual input stream. This results in needless repetition of the target optimization procedure and has a possible result of variations in the target values, so that hunting or instability may result. In the preferred embodiment the optimization process is preferably performed only if certain levels of change have occurred, reducing the amount of time spent computing the results and reducing the number of changes to the path optimizer or after a relatively long time if no changes sufficient to trigger a process have occurred. If none of the disturbance or controlled variables have changed sufficiently to exceed a trigger level, control proceeds to step 205 to determine if the backup or deadman time has passed since the optimization process was performed. This time is relatively long, preferably many sample periods, and is done just for added security as to the reasonable nature of the operation. If the period has not passed, control proceeds to step 206, where the sequence 200 is paused or goes to sleep until restarted or awakened by a scheduler 500 (FIG. 14). After being awakened, control proceeds to step 202 to reanalyze the disturbance and controlled variable values.

If the change in one of the disturbance or controlled variable values had exceeded the trigger level as determined in step 204 or the long backup time had elapsed as determined in step 205, control proceeds to step 208 where the optimization procedure is performed. This is preferably done by utilizing the neural network 108 for modeling the process, a feasible sequential quadratic programming technique to develop iteration values and maximization of the net value of the output streams. This operation is performed in a separate sequence 250 illustrated in FIG. 9 and explained below. After the sequence 250 completes, control proceeds to step 210 to determine if indeed an optimal solution had been obtained. In certain cases this may not be the case as the FSQP program may have timed out because it has become stuck in a local minima or cannot determine a transition in a case requiring a large move. If an optimal solution has not been obtained, control proceeds to step 212, where the various limits and constraints applied to the optimization process are relaxed. This restraint relaxation can be developed utilizing one of four techniques. In one case, all of the various limits or clamps on the manipulated variables and controlled variables are released, so that the best solution that can be obtained is utilized. Alternatively, the limits of the least valuable products in terms of cost of the output product can be relaxed successively. That is, the limits of least valuable first, the next least valuable second and so on can be relaxed. In a third technique, a predefined ordering, other than least valuable, can be developed and used to relax the order of the various constraints or limits.

In the preferred embodiment a fourth technique is used where certain of the constraints are considered soft constraints and others considered hard constraints. Hard constraints are typically based on physical limits, such as steam rates and steam change rates, and so should not be changed. Soft constraints, on the other hand, are typically those not based on physical concerns but on other concerns. For example, the controlled variable limits are usually imposed but are not physical limits. Thus these soft constraints are more suitable to adjustment. If optimal solutions are not developed within the specified limits of the soft constraints, then in the preferred embodiment, the transfer curve, or value curve in the case of the preferred embodiment, used in the optimization process is slightly altered so that the hard boundaries are somewhat relaxed, so that a transition to zero value for a given concentration occurs, not as a discontinuity or step, but as a continuous function. For example, if the C4 concentration limits are set at 1 and 2 mole percent, then a line is developed between the value curve at the two limits and a near zero point at 0.9 and 2.1 mole percent, with a simple cubic spline smoothing the transitions at all points of discontinuity. This slightly expanded range allows the optimization process sufficiently more room to operate to allow an optimal solution to be developed and yet not be too far from the desired limits.

After the particular values are relaxed, control returns to step 208 to determine if an optimal solution can be developed with the new limit values.

If an optimal solution had been developed, control proceeds from step 210 to step 211, where the manipulated and controlled variable target values are provided to the path optimizer 104. Control then proceeds to step 206 to wait until it is time for the next sample.

Figure 9:
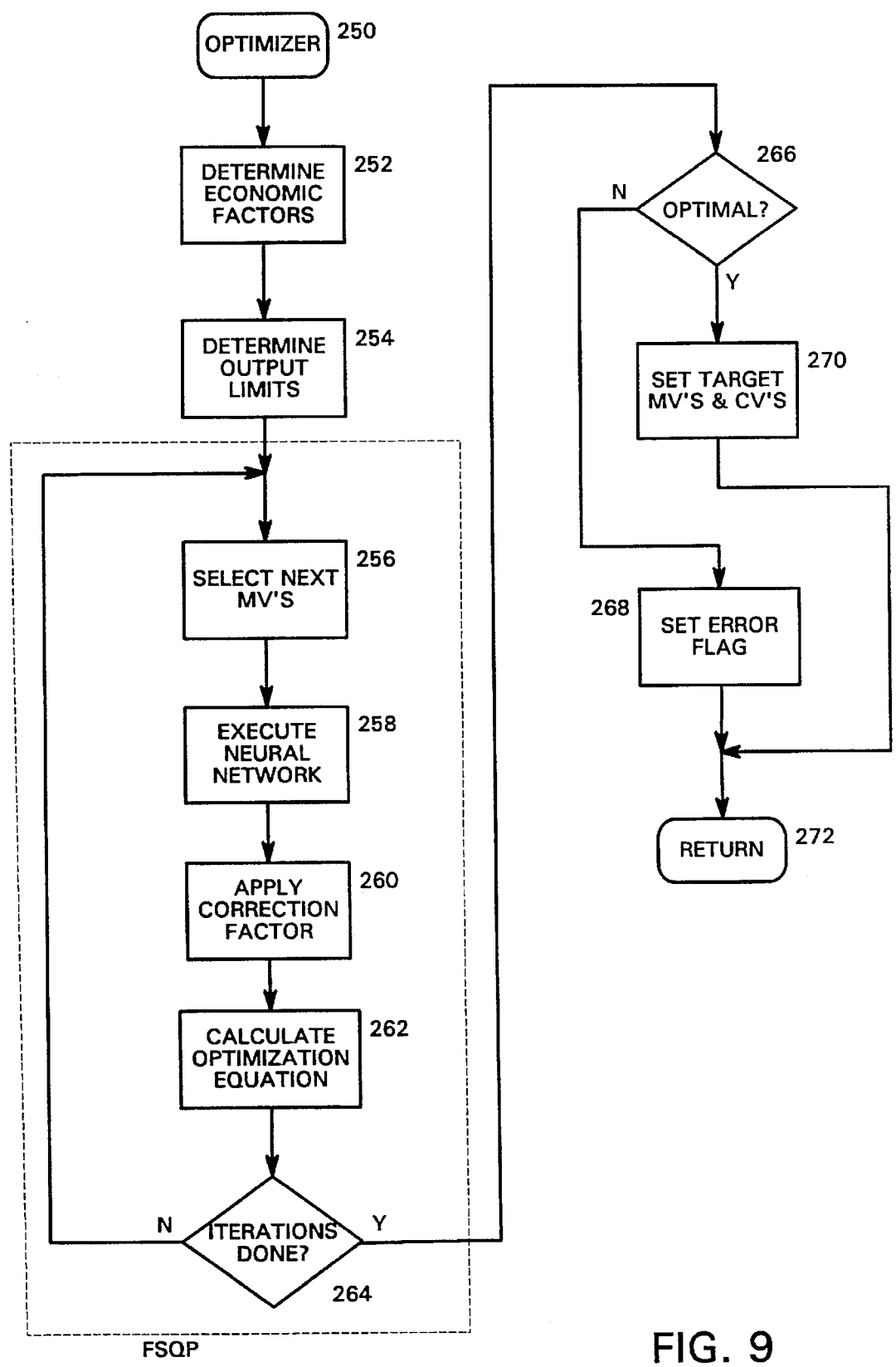
FIG. 9 is a flowchart of the operation of the optimization process in the target optimizer of FIG. 8.

As noted above at step 208, the target optimizer sequence 200 calls the optimizer sequence 250 to perform the actual optimization operations for the target optimizer 102. The optimizer sequence 250 begins at step 252, where the various economic factors of the output streams and the manipulated variables are determined. These values have preferably been previously provided to the computer by the system operator. Control then proceeds to step 254 where the limits or constraints are determined. These limits include the controlled variable limits and the manipulated variable limits. Control then proceeds to step 256, the first step of the FSQP program. The FSQP program is preferably FSQP 2.4 available from Professor Andre L. Tits at the University of Maryland in College Park, Md. The FSQP program is a series of routines which perform conventional sequential quadratic programming (SQP) techniques with the modification that the iterations used in reaching the minimized or maximized solution are performed using only feasible values. This feasible value limitation is particularly preferred for use with constraint limited physical systems, so that impossible states are never considered. Two basic techniques are used in the FSQP program in developing iterate values. The first is the use of an Armijo type arc search. The second is the use of a nonmonotonic search along a straight line. The FSQP program includes the ability to call specific functions or sequences to develop needed values. In the preferred embodiment then the FSQP internally calls the neural network 108 and a module that performs the optimization equation as steps in its overall process of determining an optimal solution. For this reason the FSQP program is shown in FIG. 9 by the broken line encompassing several steps. The description of these internal operations is believed to better illustrate the invention.

In step 256 the FSQP program selects the next manipulated variable values to be utilized in the optimization process. The manipulated variable values selected by the FSQP program in step 256, along with the current disturbance variable values, are provided as inputs to the neural network 108 in step 258. As previously noted, the neural network 108 receives four values of each manipulated variable and each disturbance variable. This is to allow the output of the neural network 108 to be a time dependent output prediction. Many processes, such as the operation of the debutanizer 20, are time dependent, that is, they have a certain inertia or time lag. Responses are not instantaneous, so trend and history information is necessary to predict the output of the operation at a time in the future. When the neural network 108 is trained, the use of the various trend indicating manipulated and disturbance variable values, along with the current controlled variable values, allows this inertia or time lag to be built into the neural network coefficients. Thus when trend indicating manipulated and disturbance variable values are provided, a time dependent controlled variable value is produced. However, if the various values of manipulated and disturbance variables are the same, that is the values provided for each manipulated and disturbance variable trend selection are identical, a steady state condition is simulated and the output of the neural network 108 is the steady state values of the controlled variables. Thus, by properly training the neural network 108 and providing varying or equal values, time dependent or steady state outputs can be obtained from a single neural network. In this particular instance of optimization sequence 250, the four values for each particular manipulated and disturbance variable are all the same because a steady state solution is desired. With these inputs, the neural network 108 then produces the model controlled variable values.

A correction factor value is added to these controlled variable values in step 260. The correction factor is based on the difference between the actual controlled variable values as last measured by the analyzers 48 and 64 or as developed by linear regression from the last measured values and the modelled values as determined by the neural network 108 for that same time sample. This provides a correction factor for inaccuracies in the model as embodied in the neural network 108. The corrected values and the values of the manipulated variables and for the controlled variables for this iteration are then used in an optimization calculation in step 262, which utilizes the feed stream flow rate and the output concentration values to develop the economic value of the output streams, which are summed to produce an output stream value. The costs of the various materials utilized, such as the steam and the cooling water, are subtracted from the output stream value to determine a net economic value for this particular group of manipulated variable values. It is understood that this particular optimization calculation is particular to the preferred embodiment example and other goals or optimization values could be selected.

If the optimization process is not complete, as determined by the FSQP program and evaluated in step 264, control returns to step 256, where the FSQP program generates another set of manipulated variable values. This cycle continues until all of the iterations of the FSQP program have been developed and preferably the target values for the controlled variable values have been developed, or the FSQP program indicates certain problems, such as a timeout or inability to develop a feasible iterate. Control then proceeds to step 266. In step 266 a determination is made as to whether an optimal value has been developed. If the solution developed is non-optimal, then a flag is set in step 268 for use in step 210. If it is optimal, control proceeds to step 270, where the appropriate, optimal manipulated variable values and control variable values associated with the maximum economic value are provided to a predetermined location for use by the path optimizer 104. Control then proceeds from steps 268 or 270 to step 272, which is a return to the calling sequence, in this case the target optimizer sequence 200.

Figure 10:
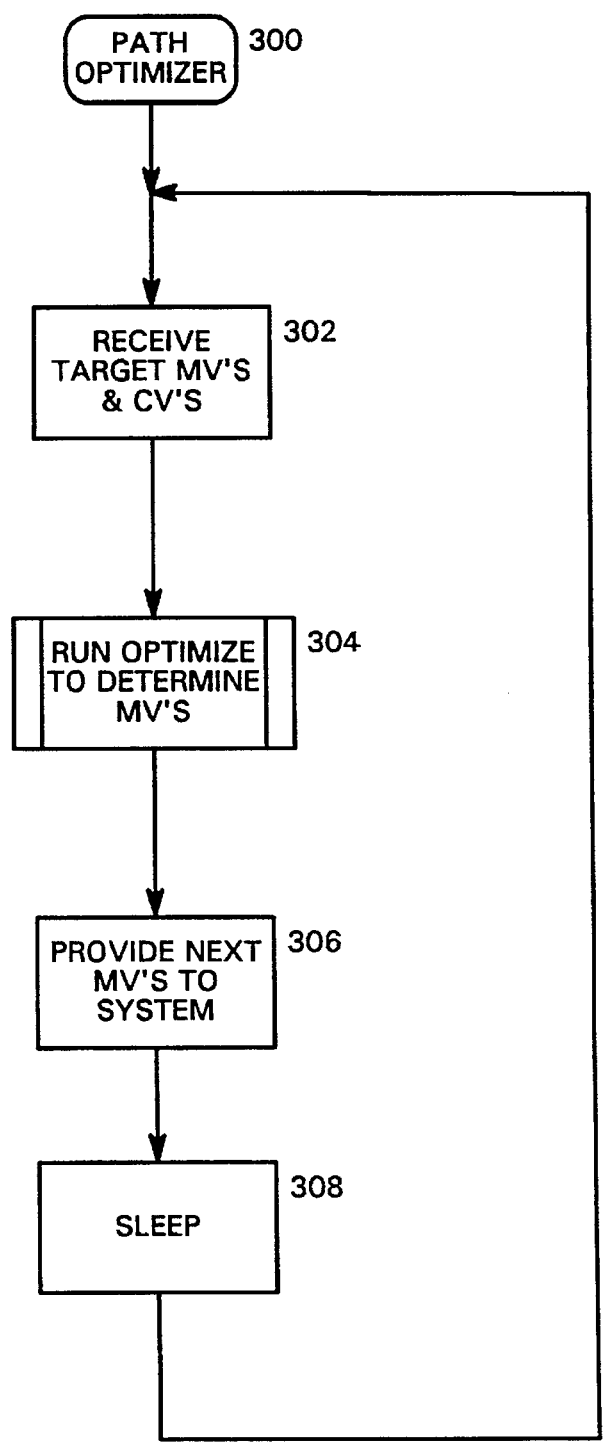
FIG. 10 is a flowchart of the operation of the path optimizer of FIG. 4.
Figure 11:
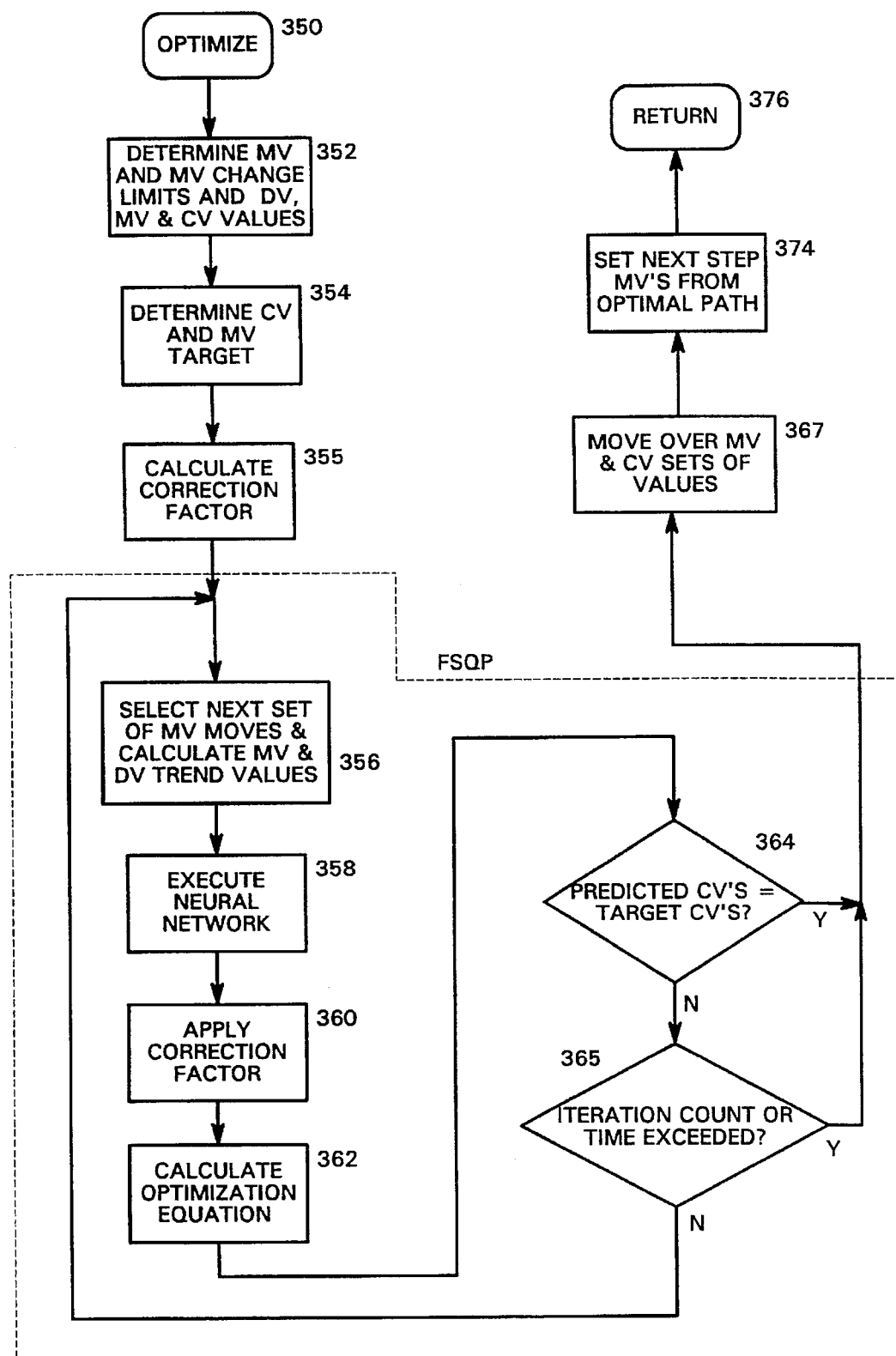
FIG. 11 is a flowchart of the optimization process in the path optimizer of FIG. 10.

The path optimizer sequence 300 (FIG. 10) performs its complete sequence of operations on a periodic basis, preferably every control cycle. The path optimizer sequence 300 commences operation in step 302, where the particular target values are retrieved. Control then proceeds to step 304, where the FSQP program, the neural network 108 and a minimization sequence are called to determine the optimal manipulated variable values for the future time steps. After this optimization is performed in sequence 350, as shown in detail in FIG. 11, control proceeds to step 306 where the manipulated variable values for the next time step are provided to the low level controllers. In the case of the preferred embodiment, valves 60, 80 and 86 have their set points changed to the new values. Additionally at this point the manipulated variable values for the entire predicated sequence can be provided to an operator workstation to allow a graphic presentation to show the operator the planned moves of the path optimizer 106. Control then proceeds to step 308, where the path optimizer sequence 300 goes to sleep. As noted, preferably the path optimizer 300 performs on a repetitive basis, to allow transfer of the optimal controlled variable values to allow a path to be developed as desired. This timing function is performed by the scheduler 500. When the proper time period has elapsed, the path optimizer sequence 300 is awakened by the scheduler 500 and control transfers from step 308 to step 302, where the path optimizer sequence 300 continues its operation to provide the next manipulated variable step.

The path optimizer sequence 350 (FIG. 11) commences at step 352, where the physical or feasible manipulated variable limits, the rate of change limits and the current manipulated, disturbance and controlled variable values are retrieved. Control then proceeds to step 354, where the target manipulated variable and controlled variable values are retrieved. Control then proceeds to step 355, where the correction factor of the controlled variables is calculated. The analyzers 48 and 66 periodically provide actual controlled variable values. These values are then used to adjust or correct the predicted values produced by the neural network 108. Because in the preferred embodiment the control cycle time is less than the time for the analyzers 48 and 66 to produce readings, intermediate readings or values are developed using a linear regression on the analyzer data. This allows the correction factor to be calculated on each control cycle.

After the calculation, control proceeds to step 356, where manipulated variable values are selected. The FSQP program in this instance selects entire series of manipulated value moves to bring the process from the current values to the target values. The rate of change of the manipulated variable limits are utilized in this selection so that each proposed manipulated variable step does not exceed certain limits, thus keeping the controlled process from being too upset or destablized by a very large change in a manipulated variable in a relatively short time. Thus each of the manipulated variable values provided in the set is within the change limits from the previous value. At this step 356 the trend indication values of the manipulated and disturbance variable values are developed for each time step. Four values are developed for each manipulated and disturbance variable using a filter equation. A simple exponential filter is used to develop the trend values. In the filter the current filtered values are determined (after the first time step) by the equations $$DV_{filter_{t0}} = \alpha DV_{filter_{t-1}} + (1-\alpha)DV_{actual_{t0}}$$

$$MV_{filter_{t0}} = \alpha MV_{filter_{t-1}} + (1-\alpha)MV_{actual_{t0}}$$

where $\alpha$ is between 0 and 1, with a lower $\alpha$ value indicating more weighting on current values and a low $\alpha$ value indicates more weighting on historical factors. Four different $\alpha$ or history factor values are used to show trend information. Because each $\alpha$ value provides a different historical weighting, this allows simple development of trend information. The four $\alpha$ values may be the same for all the manipulated and disturbance variables, but preferably different $\alpha$ value sets can be used with each variable to better track the time dependent nature of each variable. The neural network 108 then receives the various values in step 358 and produces an output of the controlled variable values at the next time step. In this case the neural network 108 receives trending manipulated and disturbance variable values, not equal values, so that a next time step prediction output is obtained from the neural network 108 for each set of input variables. This allows development of a time-based path from one state to the next. The neural network 108 thus provides the controlled variable values for each step in the set, so that the predicted output is available for the entire set to develop the values for the entire path. The predicted controlled variable values are provided to step 360 for correction. Control then proceeds to step 362, where the optimization calculation is performed. In this case, optimization is slightly more complex than the equivalent operation in step 262. In this particular case the goal is to develop a minimized balance between errors and an aggressive or stable transition to a low error condition. To easily obtain this value, the difference between the target and corrected controlled variable values is squared and multiplied by a first weighting factor. As a second component, the proposed change in the manipulated variable value is multiplied by a second weighting factor. The two values are then added to form the objective function value. This operation is performed for each step in the path, with each addition value further being summed to develop a total factor. The first weighting factor controls the impact of errors in the minimization process, while the second controls the aggressiveness of operation, which relates to the stability or smoothness of operation. The weighting factors are set by the operator. With this summed value being minimized, this is considered to be the desired path from the current location to the desired goal. Control then proceeds to step 364, to determine if a minimized value has been obtained. If not, control proceeds to step 365 to determine if an iteration count has been exceeded or calculation time exceeded. If not, control proceeds to step 356. This loop continues until the predicted result is optimal. This may require a number of iterations.

After some period, the controlled variable values should converge or the iteration or time limits are exceeded. In those cases, control proceeds from step 364 or step 365 to step 367, where the entire set of manipulated and controlled variable values for the optimal path is moved to the system. All of these values are used by the operator's workstation to show planned movements. Control then proceeds to step 374, where the manipulated variable values for the next particular step in the process associated with the optimal path as determined by the minimum summed value are set up to be provided as an output of the optimize sequence 350. Control then proceeds to step 376, a return to the calling sequence, the path optimizer sequence 200.

Figure 12:
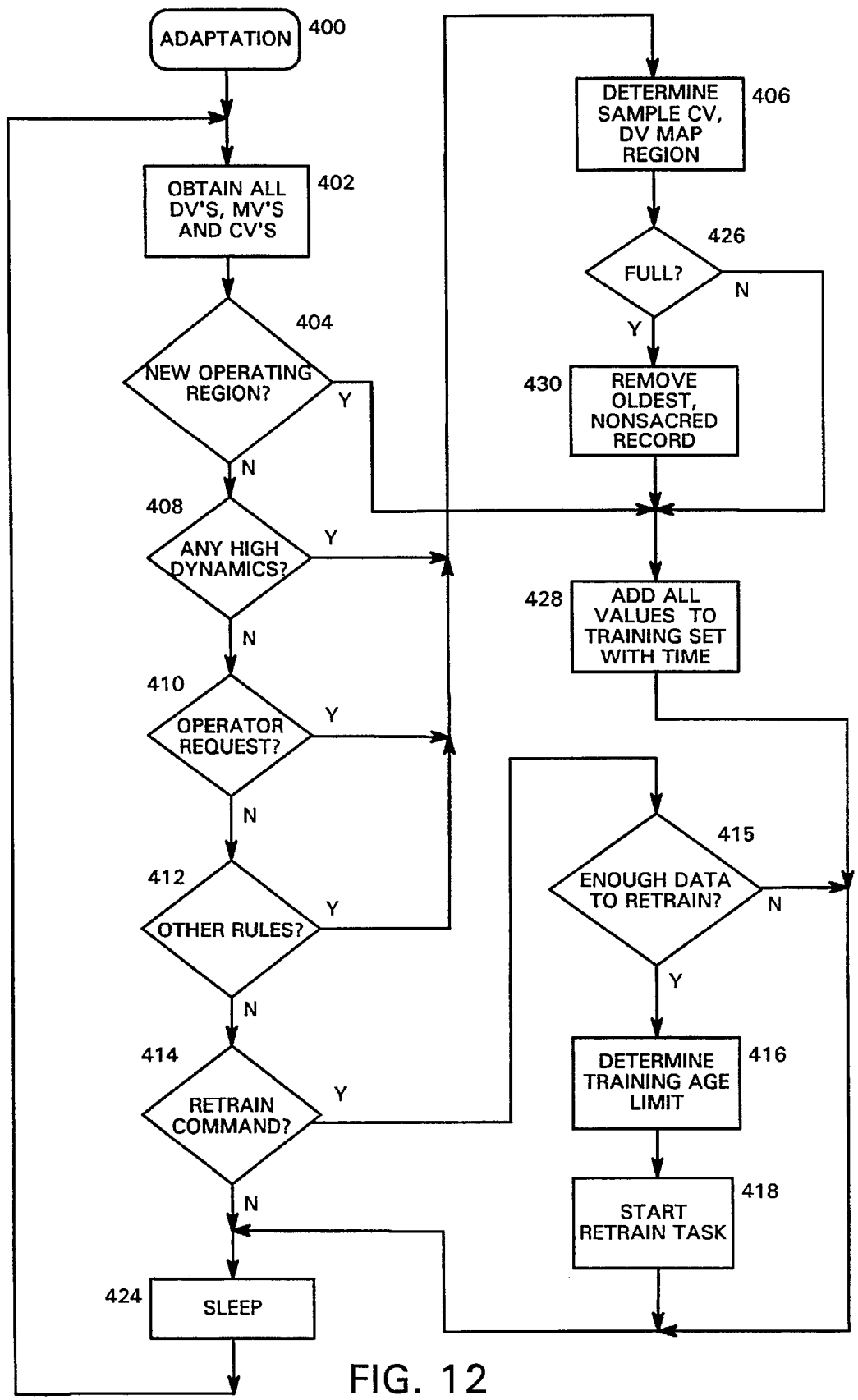
FIG. 12 is a flowchart of operation of the adaptation control of FIG. 5.
Figure 13:
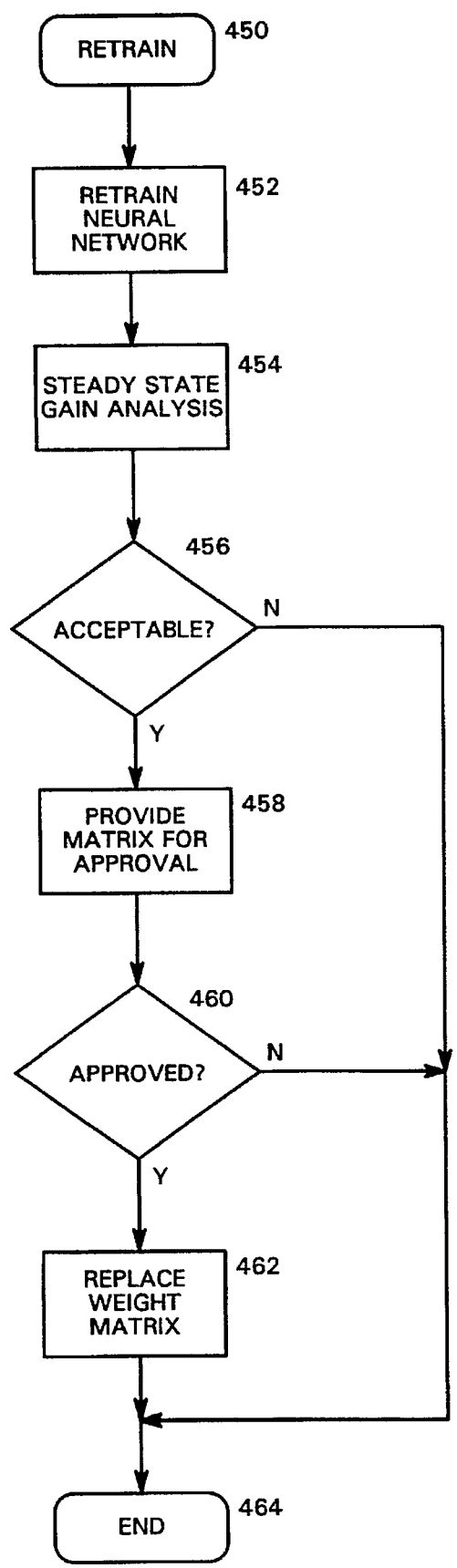
FIG. 13 is a flowchart of operation of the retraining task of FIG. 12.

The adaptation control 106 executes the adaptation sequence 400 (FIG. 12). The adaptation sequence 400 is shown in FIG. 13 and commences at step 402, where the sequence 400 obtains all of the current controlled variable, disturbance variable and manipulated variable values for possible storage as a record. The manipulated variable values are the filtered values as used in the path optimizer 104 and are stored for each sampling interval so that historical data is developed for the manipulated variables as needed to allow full training of the neural network 108. Control then proceeds to step 404 to determine if the values of the disturbance variables and control variables indicate that the system is operating in a new region in which data has not been fully obtained. Preferably the number of disturbance variables and control variables sets up the dimensions of an array, in the preferred example of FIG. 1 a six dimensional array or an n-dimensional matrix. Each one of these dimensions or variables is then further broken down into sub-intervals across the feasible range of the variables. This then develops a multiplicity of cells, zones or regions relating to particular operating conditions of the debutanizer 20. In step 404 the computer performing the adaptation sequence 400 selects the particular disturbance value variable and control variable values of this particular sample record and indexes to that particular region as developed by the mapping technique. If this is a new operating region where there are fewer then a given number of samples, it is considered appropriate to save these for retraining of the neural network 108. Control thus proceeds to step 428. If this was not a new operating region, control proceeds from step 404 to step 408 to determine if there is a very high dynamic change in the disturbance or controlled variables. If so, this sample may be of interest because it has been determined through experience that these high transient conditions are particularly desirable in training the neural network 108 and control proceeds to step 406. If there is no high dynamic situation, control proceeds to step 410 to determine if an operator request to include this particular record has been indicated. If so, control proceeds to step 406. If not, control proceeds to step 412 to determine if any other miscellaneous rules which may be developed have indicated that this particular sample is to be saved. If so, control proceeds to step 406. If not, control proceeds to step 414 to determine if the operator has provided a retraining command. A retraining command indicates that it is an appropriate time to use the collected sample set to retrain the neural network 108. Preferably retraining is commenced only on command, but retraining could be automatically initiated after a long period of time, such as one month.

If it is time to train the neural network 108, control proceeds to step 415 to determine if enough new samples are present to merit retraining. As retraining takes considerable time and resources and retraining with only a few new samples will result in only a very minor change, a predetermined number of samples is desired before retraining. If enough are present, control proceeds to step 416, where the system determines the training age limit, that is the oldest of the training samples to be utilized. For instance, if the depropanizer 20 were to have received particular damage to one of the internal trays on a given day, it would not be appropriate to train the neural network 108 with data from prior to that date, because that data would not be an accurate indication of the operation of the debutanizer 20 at the present time. Therefore by setting the training age limit, only data under the current existing physical conditions of the system would be utilized in retraining the neural network 108. If automatic retraining initiation is being used, a default age limit could be selected. After step 416, control proceeds to step 418, where a separate retraining task 450 (FIG. 13) is initiated. As noted, the process is preferably running on a multitasking environment, so this time intensive operation is separated and done in parallel with the real time operations. Control then proceeds to step 424. Control would also proceed from step 414 to step 424 if a training command had not been received and from step 415 to step 424 if too few new samples were present. In step 424 the adaptation sequence 400 pauses or goes to sleep until next awakened by the scheduler 500 to sample the various variable values.

In step 406 the computer determines the particular number of samples in the region as defined by the controlled variables and disturbance variables values. Control proceeds to step 426 to determine if that particular region is full of samples. If not, control proceeds to step 428, which is also where control has proceed from step 404, where all of the particular variable values are added to the training set with a time stamp to allow both replacement of the sample set and utilization based on the training age limits as set forth in step 416. If the region is considered full, control proceeds from step 426 to step 430, where the oldest, non-sacred training model sample record is removed. There may be certain highly distinctive sample records which are desired to be permanent portions of the training set. If so, these values can be indicated as being sacred records and thus non-removable. Control proceeds from step 430 to step 428 where the new sample is added, replacing the removed record. After step 428 control proceeds to step 424 to wait until the next time to sample the variables.

The actual retraining task 450 is illustrated in FIG. 13. The task 450 commences at step 452 where the neural network 108 is retrained using conventional techniques, preferably back propagation techniques, as well known to those skilled in the art. Control then proceeds to step 454 where a steady state gain change analysis is performed. Step inputs are provided to the old and new weight matrices and the resulting output changes compared. If the change in the output exceeds certain limits or has actually changed direction, then the new weight matrix is suspect, as these values should not change radically between retraining intervals. If suspect as determined in step 456, control proceeds to step 464. If the steady state gains appear to be within the limits, control proceeds to step 458 where the new weight matrix is provided for operator approval. Operator approval before implementation is preferred to allow all interested parties to become comfortable with the proposed weight matrix and resultant process operation. If not approved in step 460, control proceeds to step 464. If approved, in step 462 the new weight matrix values replace the prior values and operation of the control system 100 then proceeds with the new values. Control then proceeds to step 464, where the retraining task 450 terminates.

Operation of the scheduler 500 is shown in FIG. 14. The scheduler 500 awakens the target optimizer sequence 200, the path optimizer sequence 300 and the adaption control sequence 400 on a regular basis to allow those operations to be performed. Operation of the scheduler 500 commences at step 502 where the target optimizer sequence 200 is awakened or restarted. Control proceeds to step 504, where control loops until the target optimizer sequence 200 has put itself back to sleep. Control then proceeds to step 506, where the path optimizer sequence 300 is awakened. Control proceeds to step 508, where control remains until the path optimizer sequence 300 returns to sleep. Control then proceeds to steps 510 and 512 where similar actions are taken relating to the adaptation control sequence 400. Control then proceeds to step 514, to determine if the time for the next sample or pass through the sequences has elapsed. If not, control remains at step 514 until the sample time arrives. If so, control returns to step 502 and the process repeats.

Preferably, during normal operations the target optimizer 102, the path optimizer 104 and the adaptation control 106 are all executing sequentially as shown in FIG. 14. But the target optimizer 102 and the path optimizer 104 cannot be allowed to control the debutanizer 20 until satisfactory coefficients are developed for the neural network 108. Preferably this is done by running just the adaptation sequence 400 on the debutanizer 20 as it operates under the control of its prior control system, which is to be replaced by the control system 100. This allows actual, site-specific data to be readily gathered to develop a close original weight matrix. As a next step, the control system 100 can be run in control but no write shadow mode, with the target optimizer 102 and the path optimizer 104 outputs not actually applied to the controllers. A comparison of the two control systems can then be performed for an extended period to gain confidence in the control system 100. Eventually the outputs are activated and a changeover occurs. Then the adaptation control 106 can develop more accurate training information, which over time will tune the neural network weight matrix to the optimal values for the particular debutanizer 20. This additional training can readily increase the effective nonlinearity of the model to better approach the nonlinearities of the actual system, resulting in greatly improved performance over much broader ranges than a linear model attempting to control the same system.

It is understood that the debutanizer 20 is the preferred embodiment and has been provided as an example. The techniques and processes according to the present invention can be utilized in many other process control environments, particularly multivariable and more particularly nonlinear, and no limitations are necessarily intended by the detailed description of debutanizer operation. Further, it is understood that other neural network arrangements can be used, depending on the particular process and environment. Additionally, the number of manipulated, disturbance and controlled variables, optimization goals and variable limits can be changed to suit the particular process of interest.

Having described the invention above, various modifications of the techniques, procedures, material and equipment will be apparent to those in the art. It is intended that all such variations within the scope and spirit of the appended claims be embraced thereby.

We claim:

1. A method for developing a sample set for training a neural network, the method comprising the steps of:

obtaining values of various inputs and outputs of the neural network at a specific time to form a new sample;

developing an n-dimensional matrix of cells, wherein n is a total number of inputs and outputs of the neural network, an axis has a total range corresponding to a value range of respective inputs or outputs of the neural network, each axis total range being subdivided into cell ranges to result in a plurality of cell ranges for each axis, whereby a total number of cells in said matrix is a product of number of cell ranges in the total range for each axis;

determining a corresponding cell in said n-dimensional matrix based on obtained input and output values in said new sample;

determining a number of previously stored samples in said corresponding cell; and adding said new sample to previously stored samples if said determined number is below a predetermined list.

2. The method of claim 1, further comprising the steps of:

if said determined number of previously stored samples exceeds said predetermined number, further determining if said new sample includes certain values indicating other predetermined conditions desirable for training the neural network; and removing a previously stored sample in said corresponding cell if said new sample includes said certain values and adding said new sample to the previously stored samples.

3. The method of claim 2, wherein a previously stored sample which is removed is an oldest sample.

4. The method of claim 1, wherein a previously stored sample which is removed is an oldest sample which is not marked as being a permanent sample.

* * * * *

UNITED STATES PATENT AND TRADEMARK OFFICE
CERTIFICATE OF CORRECTION

PATENT NO. : 5,640,491
DATED : June 17, 1997
INVENTOR(S) : Naveen V. Bhat, William B. Braden, Kent E. Heckendoorn, Timothy J. Graettinger, Alexander J. Federowicz, Paul A. Dubose It is certified that error appears in the above-identified patent and that said Letters Patent is hereby corrected as shown below:

Column 4, line 38, please delete "propalyne" and insert --propylene--.
Column 5, line 33, please delete "end" and insert --and--.
Column 7, line 48, after "1" please delete the comma and insert a period.
Column 12, line 14, please delete "destablized" and insert --destabilized--.
Column 14, line 15, please delete "20" and insert --22--.
Column 14, line 40, please delete "proceed" and insert --proceded--.
Column 15, line 12, please delete "adaption" and insert --adaptation--.

Signed and Sealed this

Eleventh Day of May, 1999

Q. TODD DICKINSON

Attest:

Attesting Officer

Acting Commissioner of Patents and Trademarks